United States Patent
Cross

[11] Patent Number: 5,785,243
[45] Date of Patent: Jul. 28, 1998

[54] CLIMATE CONTROL SENSOR APPARATUS

[76] Inventor: Andrew Cross, 1703 Alba Ave., Mobile, Ala. 36605

[21] Appl. No.: 834,017

[22] Filed: Apr. 11, 1997

[51] Int. Cl.$^6$ .............................. E21B 23/00; G05D 23/00
[52] U.S. Cl. .............................. 236/47; 165/237
[58] Field of Search ............... 236/47, 51; 165/11.1, 165/237

[56] References Cited

U.S. PATENT DOCUMENTS

| | | | |
|---|---|---|---|
| 4,360,856 | 11/1982 | Witthaus | 361/170 |
| 4,386,275 | 5/1983 | Kalmowitz et al. | 250/342 |
| 4,485,864 | 12/1984 | Carrell et al. | 236/47 X |
| 4,992,701 | 2/1991 | Sacchetti | 315/159 |
| 5,127,575 | 7/1992 | Beerbaum | 236/47 X |
| 5,281,961 | 1/1994 | Elwell | 340/825 |
| 5,476,221 | 12/1995 | Seymour | 236/51 X |

*Primary Examiner*—William E. Wayner
*Attorney, Agent, or Firm*—Patent & Trademark Services; Joseph H. McGlynn

[57] ABSTRACT

An apparatus for activating climate control systems in response to the entry and/or presence of person(s) in a dwelling. An interior sensor apparatus includes a motion or thermal energy detection unit which emits a signal in response to the presence of person(s) within a room. A door entry sensor emits a signal upon entry of person(s) into the dwelling. A climate control unit, such as an air conditioner, has a default temperature setting which is activated upon the expiration of a timing sequence maintained by a timing circuit. The timing circuit is reset upon detection of persons by the motion/thermal detection unit or the door entry sensor.

3 Claims, 1 Drawing Sheet

CLIMATE CONTROL SENSOR APPARATUS

BACKGROUND OF THE INVENTION

The present invention relates generally to electronic sensor devices, and in particular to a sensor apparatus which engages with the climate control unit of a dwelling in response to the entrance or presence of persons within the dwelling.

DESCRIPTION OF THE PRIOR ART

Various electronic sensors are known which can detect motion and other changes in room conditions. U.S. Pat. Nos. 4,992,701 and 5,281,961 describe emotion detecting devices. The '701 Patent describes a motion detecting light controller system having a control circuit with a power switching triac and an infrared detector.

The '961 Patent discloses a ceiling sensor which detects motion through Doppler shifts in transmitted signals, and which is designed to interface with energy management systems.

U.S. Pat. No. 4,386,275 discloses an infrared sensor which detects the presence of a heat emitting body, and U.S. Pat. No. 4,360,856 describes an sensor package having six sensor amplifier circuits for various conditions.

While the prior art has provided various useful sensors, it has not disclosed a sensor device which interfaces with climate control systems in a manner that optimizes energy efficiency. There remains a need for a sensor apparatus which provides for a timed resetting of climate control systems in response to detection signals, in order to reduce the waste occasioned when momentary presence of persons activates a system.

SUMMARY OF THE INVENTION

The present invention is a sensor apparatus which interfaces with the climate control system of a dwelling, to activate and deactivate the system in response to the entrance and presence of persons in the dwelling. The invention comprises a wall unit having a motion or thermal sensor which emits a signal in response to the presence of persons in the room. Also provided is a sensor mounted on the door frame of the dwelling to detect the entrance of persons into the room. This sensor could consist of one of several different types, including a mechanical or magnetic reed sensor which responds to the physical opening of the door, or to a sensor engaged by the use of a card key.

Both the door sensor and the interior room sensor engage with the climate control system in the following way. The climate control system has a default setting, which determines the temperature of the dwelling when it is unoccupied. The occupant is free to adjust the desired temperature to a setting different from the default temperature. However, the default setting is reinstated when no impulses are received from either of the two sensors after a specified period, which is determined by a timing circuit. In this manner, the climate control system is kept at its most efficient setting unless there is a continuing occupancy of the dwelling.

Accordingly, it is an object of this invention to provide an improved sensor apparatus.

It is a further object of this invention to provide a sensor system which detects the entrance and occupancy of persons in a dwelling.

It is still further an object of this invention to provide a sensor apparatus which interfaces with the climate control system of a dwelling to maximize the efficiency of the system.

It is still further an object of this invention to provide a sensor apparatus which includes a device for resetting the climate control system of a dwelling after a specified period of vacancy.

These and other objects and advantages of the present invention will become apparent from the detailed description below, when taken in conjunction with the annexed drawings.

DESCRIPTION OF THE PREFERRED EMBODIMENT

Figure 1:
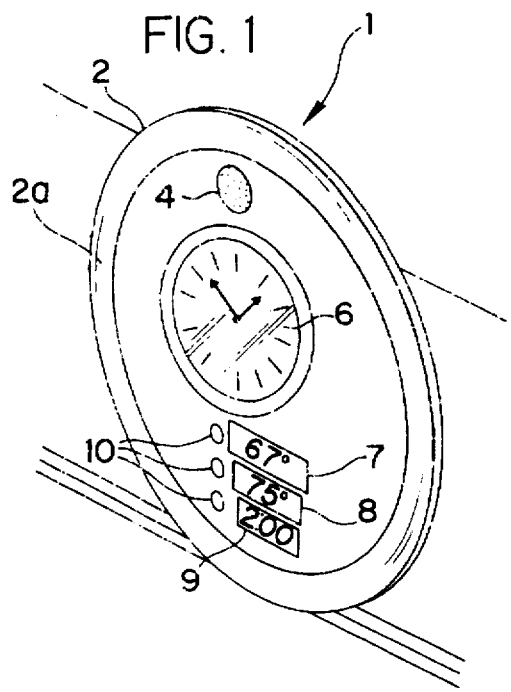
FIG. 1 shows a perspective view of the wall unit of the present invention, installed on a wall surface.
Figure 2:
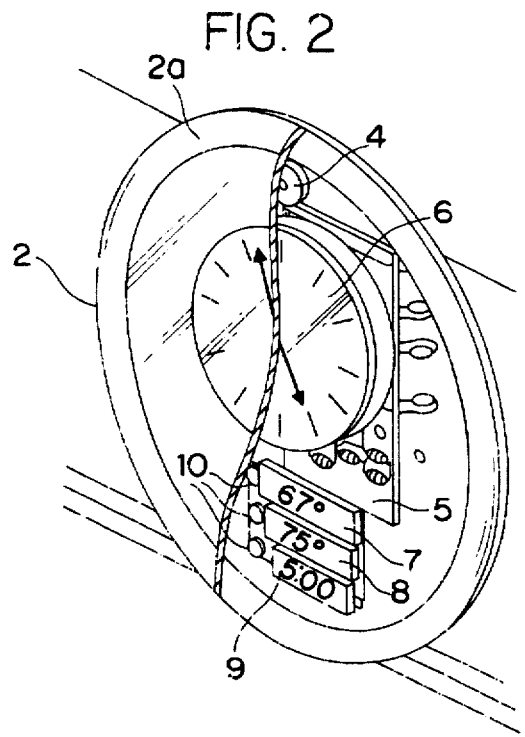
FIG. 2 shows a view similar to that shown in FIG. 1, with parts cut away for clarity.
Figure 3:
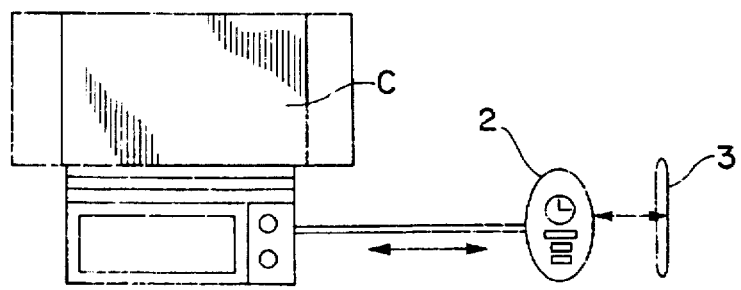
FIG. 3 shows a schematic representation of the climate control system of a dwelling in conjunction with the wall unit and entry sensor of the present invention.

Referring now to the drawings in greater detail, it can be seen in FIG. 3 that the present invention 1 comprises an interior wall unit 2 and a door entry sensor 3 connected to a climate control unit C of a dwelling, shown in FIG. 3 as an air conditioning unit. Wall unit 2 is positioned on a wall surface or some other accessible location in a dwelling, while the door entry sensor 3 is located on or near the door jamb.

The wall unit 2 is depicted separately in FIGS. I and 2 comprising a casing 2a, a motion/thermal energy detection sensor 4, a circuit board 5, a conventional clock 6, and three liquid crystal display units 7, 8, 9. The wall unit 2 functions to monitor the presence of persons within the dwelling and to activate the default temperature setting of the climate control unit C on a timed delay. If no presence is detected for a specified period of time, 10 minutes, for example, the climate control unit C is returned to the default setting.

The motion or thermal energy detection sensor 4 can consist of one of several known sensing devices which emit a pulse in response to the presence of person(s) within a room. For example, the sensor 4 can be a known type of infrared sensor having several cells with overlapping infrared sensing surfaces. In this type of sensor, the current outputs of the cells are matched under steady state conditions. An imbalance in the current output of the sensors, caused by the detection of infrared radiation in the field of view of one or more of the cells, is used to generate a voltage which is amplified to create a detection signal. The sensor 4 could also consist of a known type of motion sensor which uses a transmitted signal of known frequency, responding to Doppler shifts in the frequency that occur in the presence of an interfering body. Of course, a variety of presence detecting sensors are known, and any suitable type could be used without departing from the scope of the invention.

The ambient temperature, desired temperature, and countdown time are indicated by liquid crystal display units 7, 8, 9, respectively. These units are of a type commonly known in the art, and are connected, by any conventional means, to integrated circuits on the circuit board 5. Ambient temperature display 7 is activated by a circuit communicating with any temperature sensor commonly used in the art of climate control systems. Circuit board 5 further has means to emit a signal to the climate control unit C which activates when the desired temperature differs from ambient temperature.

Under steady state conditions, that is, when the sensor 4 has detected no presence within the room, the desired temperature is set at a specified default level, which is indicated on display unit 8. The timer circuit, having display unit 9, is set at zero under steady state. Upon detection of a presence within the room, the sensor 4 emits a signal resetting the timing circuit, which begins a countdown to zero that is indicated on the display unit 9. The desired temperature may be adjusted by a button control 10 on the wall unit 2. When the timing sequence reaches zero, the control circuit for the desired temperature is activated to reset the temperature to the default setting. Thus, any continuing presence within the room which activates the sensor 4 will continually reset the timing circuit and prevent the readjustment of desired temperature to the default setting.

As shown in FIG. 3, wall unit 2 is also connected to a door entry sensor 3. This sensor may consist of several different types, including, but not limited to, a mechanical switch or a magnetic reed sensor. A mechanical switch type sensor could comprise a spring biased switch mounted on the door frame and controlling a circuit which emits a signal to the interior sensor unit. Upon opening of the door, timer circuit on the wall unit 2 would be activated by the signal and reset at the specified countdown time. A magnetic reed type sensor would operate in a similar fashion, having instead a magnet mounted on the door and operably engaging a switch controlling a signal circuit in the door frame. In this arrangement, the opening of the door would separate the magnet from the switch, opening the circuit and generating a signal which is transmitted to the timing circuit. Of course, many other types of sensing devices are known which could be employed to detect the physical opening of a door. For example, it is common today to have card entry systems, wherein persons insert a card into a computerized identification system. Such systems have means to transmit signals operably engaging various systems, and such an arrangement would be useful for activating the aforementioned timing circuit on the wall unit 2.

The usefulness and advantages of the present invention may now be appreciated. Interior thermal/motion sensor 4 and the door entry sensor 3 serve to monitor entry of and/or presence of a person(s) in a dwelling so that the climate control system is returned to an efficient setting when the dwelling is unoccupied. This has obvious energy saving advantages, especially for those operating commercial motels, where patrons tend to adjust temperature controls at overly consumptive settings. Of course, the present invention also provides a means for private homeowners to cut energy costs with minimal personal monitoring.

In use, when the climate control detects entry into a room, by activation of the door jam switch 3, a signal is sent to the air conditioning/heating unit which will deactivate its default setting, and at the same time, activate the 10 minute countdown timer. The occupant of the room may now adjust the temperature of the room to a comfortable temperature. The air conditioning/heating unit will remain at this setting as long as the motion/heat sensor detect a presence in the room. The countdown timer will continually reset itself, to 10 minutes, when it reaches zero as long as the motion/heat sensor detect a presence in the room.

If the motion/heat sensor does not detect a presence in the room, the countdown timer will not reset itself, and when it reaches zero, the air conditioning/heating unit will revert back to its default setting. The default setting would remain active until the door jam sensor or the motion/heat sensor again activates the unit.

The invention is constructed from inexpensive, commercially available components, making it an attractive alternative to more expensive energy saving methods, such as the installation of insulation or thermal windows.

Although the climate control sensor device and the method of using the same according to the present invention has been described in the foregoing specification with considerable details, it is to be understood that modifications may be made to the present invention which do not exceed the scope of the appended claims and modified forms of this invention done by others skilled in the art to which the invention pertains will be considered infringements of this invention when those modified forms fall within the claimed scope of the invention.

What I claim as my invention is:

1. An air conditioning/heat control system for a dwelling comprising:

means connected to an entrance to a dwelling for detecting the entrance of a person to said dwelling, said means electrically connected to a main control panel, said control panel having temperature detecting means for determining the ambient temperature of said dwelling, and control means for setting a default temperature setting, and means for setting a temperature in said dwelling, and a countdown timer, whereby when said means connected to an entrance to a dwelling detects the entrance of a person to said dwelling, the main control panel deactivates said default setting and activates said countdown timer and allows a person to control the means for setting a temperature in said dwelling.

2. The air conditioning/heat control system for a dwelling as claimed in claim 1, wherein said main control panel also contains a motion/heat sensor means for detecting the presence of a person in said dwelling, said motion/heat sensor means deactivates said countdown timer when the presence of a person is not detected for a predetermined time, when said motion/heat sensor means activates said countdown timer, said countdown timer runs for a predetermined period of time and then activates said control means for setting a default temperature setting.

3. The air conditioning/heat control system for a dwelling as claimed in claim 1, wherein said main control panel also contains control means for manually setting said countdown timer, said control means for setting a default temperature setting, and said means for setting a temperature in said dwelling.

\* \* \* \* \*